(12) United States Patent
Bromley

(10) Patent No.: US 6,295,661 B1
(45) Date of Patent: Oct. 2, 2001

(54) AUTOMATIC SHUT-OFF VALVE

(76) Inventor: Arthur J. Bromley, 15432 SE. 103$^{rd}$ St. Rd., Oklawaha, FL (US) 32179

(*) Notice: Subject to any disclaimer, the term of this patent is extended or adjusted under 35 U.S.C. 154(b) by 0 days.

(21) Appl. No.: 09/593,939

(22) Filed: Jun. 15, 2000

Related U.S. Application Data

(60) Provisional application No. 60/198,779, filed on Apr. 21, 2000.

(51) Int. Cl.$^7$ ..................................................... E04H 4/06
(52) U.S. Cl. ................... 4/504; 4/507; 137/362; 251/295
(58) Field of Search ............................. 4/504, 507, 509, 4/496, 661; 251/295; 137/362

(56) References Cited

U.S. PATENT DOCUMENTS

| | | | |
|---|---|---|---|
| 2,839,264 | * 6/1958 | Trubert | 251/295 |
| 3,306,448 | * 2/1967 | Baker | 4/509 X |
| 3,923,081 | 12/1975 | Persson | 137/217 |
| 4,115,878 | * 9/1978 | Johnson et al. | 4/492 |
| 4,398,557 | 8/1983 | Dugge | 137/526 X |
| 4,556,084 | 12/1985 | Frawley | 137/526 |
| 4,658,449 | 4/1987 | Martin | 4/496 |
| 4,941,503 | 7/1990 | Hubner, Jr. | 137/526 X |
| 5,273,068 | 12/1993 | Duren | 137/526 |
| 5,682,624 | 11/1997 | Ciochetti | 4/509 |
| 5,809,587 | 9/1998 | Fleischer | 4/504 |

* cited by examiner

*Primary Examiner*—Robert M. Fetsuga
(74) *Attorney, Agent, or Firm*—Paul S. Rooy

(57) ABSTRACT

An automatic shut-off valve for installation on a sing pool or spa main drain. The automatic shut-off valve has a soft gasket, ball, and ball spring between a grate and a housing. The grate is free to reciprocate up and down relative to the housing. Downward reciprocation of the grate urges the ball into sealable engagement with a valve seat in the housing. During operation, a swimmer covers sufficient grate apertures so that the grate is moved downwards as urged by the main drain suction, towards a swimming pool or spa main drain over which the automatic shut-off valve is mounted. The downward motion of the grate urges the ball into sealable engagement with a valve seat in the housing, where it is securely held by the main drain suction. In this fashion, the ball is entrapped instead of the swimmer, thus avoiding possible disembowelment and/or drowning on the part of the swimmer.

17 Claims, 8 Drawing Sheets

AUTOMATIC SHUT-OFF VALVE

This application claims benefit and priority of provisional patent application Ser. No. 60/198,779 filed Apr. 21, 2000.

BACKGROUND OF THE INVENTION

1. Field of the Invention

This invention relates to valves, and in particular to an emergency shut-off valve for use in swimming pools, spas and hot tubs and the like, to help prevent main drain entrapment.

2. Background of the Invention

Most people are aware of the possibility of drowning associated with water activities. Fences are erected around swimming pools in residential back yards to prevent non-swimming children from wandering into the pool. A less well-known hazard connected with swimming pools and hot tubs is the horrifying possibility of becoming entrapped by the vacuum pulled by the pool or hot tub pump at the main drain. If an individual—typically a child between the ages of 2 and 16—were to sit an a main drain, completely blocking it, disembowelment could occur. Even if the child were to block the main drain with a different body part, thus avoiding disembowelment, entrapment could occur, holding the child underwater. If the pump is not stopped, interrupting the vacuum, the child could drown.

A typical swimming pool main drain circulation system is depicted in FIG. 1. Pool 2 filled with water 4 comprises main drain 6 communicating with sump 9 covered by grate 8. Pump 12 draws water through outflow pipe 10 (the main drain "line"), and pumps it back into pool 2 through inflow pipe 14. A pool filter (not shown) is typically installed on inflow pipe 14 between pump 12 and pool 2. The pool circulation system is used to run pool water through the pool filter to clean water 4, as well as to provide a mixing effect to homogeneously distribute pool water additives such as chlorine, algaecide, acidity/alkalinity pH equalizers, etc.

Between the years 1980 and 1996 fifteen incidents of disembowelment were reported to the U.S. Consumer Product Safety Commission. See *Guidelines for Entrapment Hazards: Making Pools and Spas Safer* pg. 2 (U.S. Government Printing Office 1998). The typical scenario involved children between the ages of 2 and 6 who sit on the uncovered drain of a public wading pool whose cover has been broken or is missing. Id. When the child's buttocks cover the drain, evisceration can occur through the ruptured septum extremely quickly, even where the change of pressure is small. Id. A 2.2 pound vacuum is considered the threshold for evisceration. *Pool and Spa News*, pg. 22 (Apr. 23, 1997). The speed of the disembowelment in itself is frightening—the evidence indicates disembowelment injuries take place in a fraction of a second once the child sits on the drain. *Pool & Spa News—Special Reports* Pg. 7 (1997). Although the disembowelment is not generally fatal, the loss is permanent and irreversible, and has a devastating effect on the victim's future health and happiness. *Guidelines for Entrapment Hazards: Making Pools and Spas Safer* pg. 2 (U.S. Government Printing Office 1998).

Nine cases of body entrapment, including seven which resulted in death, were reported between January 1990 and May 1996. Id. Six of the incidents occurred in spas, two in swimming pools, and one in a wading pool. In one case, a sixteen year old girl was trapped on a 12 in.x12 in. drain grate in a large public spa, and drowned. Id. These entrapment incidents involved primarily children between the ages of 8 and 16.

Still another entrapment scenario involves the victim's hair becoming entrapped in the main drain. At least 30 hair entrapment incidents were reported to the Consumer Product Safety Commission between 1990 and 1998, of which 10 were fatal. Id. at pg. 3. These incidents typically involved long, thin female head hair becoming entangled in the apertures and protrusions around main drain grates. The entrapment occurred because of entanglement, not strong suction forces. Id.

This main drain entrapment and disembowelment problem is viewed to be sufficiently serious to warrant legislative action: currently statutes exist in several states (including California and Ohio) requiring main drains safety features, and legislation is pending in several other states.

Existing Designs

A number of approaches have been taken towards preventing the disembowelment/entrapment problem. One approach has been to mandate at least two drains, so if one of them is obstructed, the other will operate to relieve excessive suction at the obstructed drain. Where only one drain has been installed in an existing pool or hot tub, this approach can be expensive, and may involve tearing up the existing concrete pool deck to install piping. In addition, independent valves for each resultant drain are typically provided. If one of the drain valves is closed, then the safety of the additional drain is defeated. Also, while two working drains may ameliorate the disembowelment problem and the suction entrapment problem, it does little to prevent the hair entrapment problem, which is not caused by suction.

Another approach has been to provide an indication and control system which senses a vacuum rise in the main drain line, and turns off the main drain pump, thus relieving the vacuum at the main drain after a certain time lapse. The presence of an indication and control system which includes a vacuum sensor attached to a switch, which then shuts down the main drain pump, which then after a period of time relieves the vacuum present at the main drain, necessarily involves a certain delay between the time the vacuum increases at the main drain and the time the vacuum is actually relieved at the main drain. If at any time during this inherent system delay the main drain vacuum exceeds the 2.2 pound threshold, permanent and irreversible damage has already been inflicted on the victim in the disembowelment scenario.

While the indication and control pump shut-off switch approach may help release individuals trapped by vacuum at the main drain before they drown, critics question whether these devices can prevent disembowelment, because disembowelment occurs so quickly, and it is difficult to determine exactly how much suction, and for what duration, the human body can tolerate vacuum without damage. See *The Great Entrapment Debate*, Pool & Spa News Pgs. 55, 56 (Aug. 18, 1999).

Although the currently available shut-off valves may prevent suction entrapments, they may be ineffectual in disembowelment accidents, because these occur in a fraction of a second. See *Pool & Spa News—Special Reports* Pg. 7 (1997).

SUMMARY OF THE INVENTION

Accordingly, it is an object of the present invention to provide an automatic shut-off valve which does not rely on an indication and control system, main drain pump shut-off, and subsequent release of vacuum at the main drain, along with the delay inherent in this scheme, to prevent dangerous vacuum build-up at the main drain. Design features allowing this object to be accomplished include an automatic shut-off valve installed at the main drain itself, which senses vacuum at the main drain itself, and which shuts off water flow at the main drain itself before vacuum at the main drain reaches dangerous levels. The automatic shut-off valve operates without having to shut off the main drain pump, and without having to wait until the main drain line vacuum dissipates, and thus provides main drain vacuum relief before main drain vacuum can reach dangerous levels. Advantages associated with the accomplishment of this object include prevention of disembowelment and suction-type entrapment incidents.

It is another object of the present invention to provide an automatic shut-off valve which provides a visual grate failure indication. Design features allowing this object to be accomplished include a ball having positive buoyancy which floats to the surface of the pool or hot tub if the grate becomes dislodged. A benefit associated with the accomplishment of this object is the provision of a warning to potential victims that the automatic shut-off valve requires servicing, before an accident can occur.

It is still another object of this invention to provide an automatic shut-off valve which incorporates a back-up function which blocks the main drain if the grate becomes dislodged and the positive buoyancy warning ball floats to the surface. Design features enabling the accomplishment of this object include a spring-loaded cap which automatically closes over the main drain in the event of grate failure and ball release. An advantage associated with the realization of this object is a back-up main drain shut-off function, and the associated increased reliability and safety advantages.

It is another object of the present invention to provide an automatic shut-off valve which is quickly and easily retrofittable to existing main drains. Design features allowing this object to be accomplished include a grate, soft gasket and housing which incorporate co-extensive bolt patterns sized to fit a standard main drain threaded bore pattern. Benefits associated with the accomplishment of this object include reduced time and cost of installation, and thus increased availability.

It is still another object of this invention to provide an automatic shut-off valve which provides protection against hair entrapment. Design features enabling the accomplishment of this object include a hair barrier installed over a grate. Advantages associated with the realization of this object include reduced chance of hair entrapment, and consequent reduced chance of associated entrapment injury.

It is still another object of this invention to provide an automatic shut-off valve which will not obstruct automatic pool cleaning equipment. Design features enabling the accomplishment of this object include a soft gasket ramp. Advantages associated with the realization of this object include uninterrupted pool cleaning, along with the attendant health advantages.

BRIEF DESCRIPTION OF THE DRAWINGS

The invention, together with the other objects, features, aspects and advantages thereof will be more clearly understood from the following in conjunction with the accompanying drawings.

Eight sheets of drawings are provided. Sheet one contains FIG. 1. Sheet two contains FIG. 2. Sheet three contains FIG. 3. Sheet four contains FIG. 4. Sheet five contains FIG. 5. Sheet six contains FIG. 6. Sheet seven contains FIG. 7. Sheet eight contains FIGS. 8 and 9.

DETAILED DESCRIPTION OF THE PREFERRED EMBODIMENT

Figure 1:
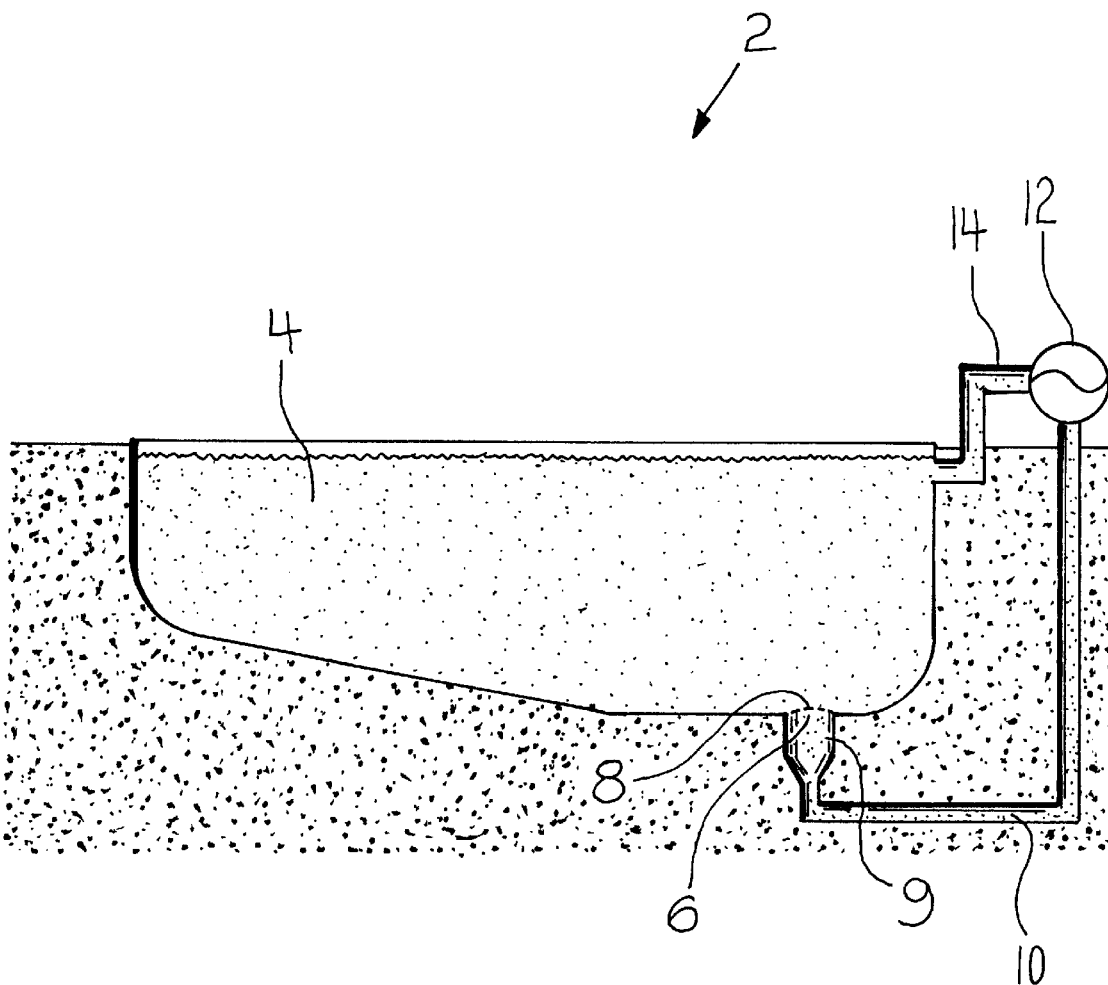
FIG. 1 is a side cross-sectional view of a typical pool water circulation system.
Figure 2:
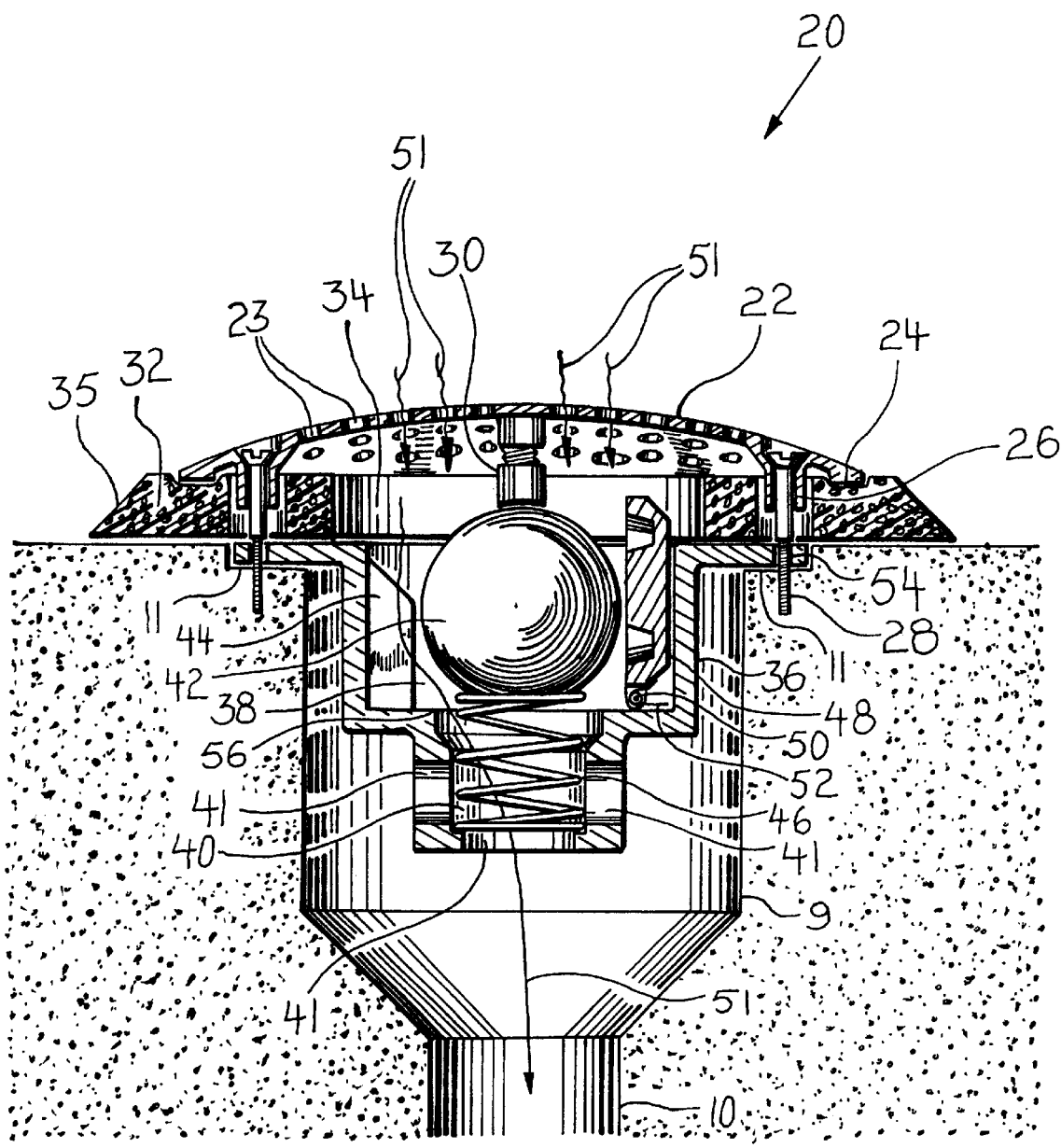
FIG. 2 is a side cross-sectional isometric view of an automatic shut-off valve in the open position.
Figure 3:
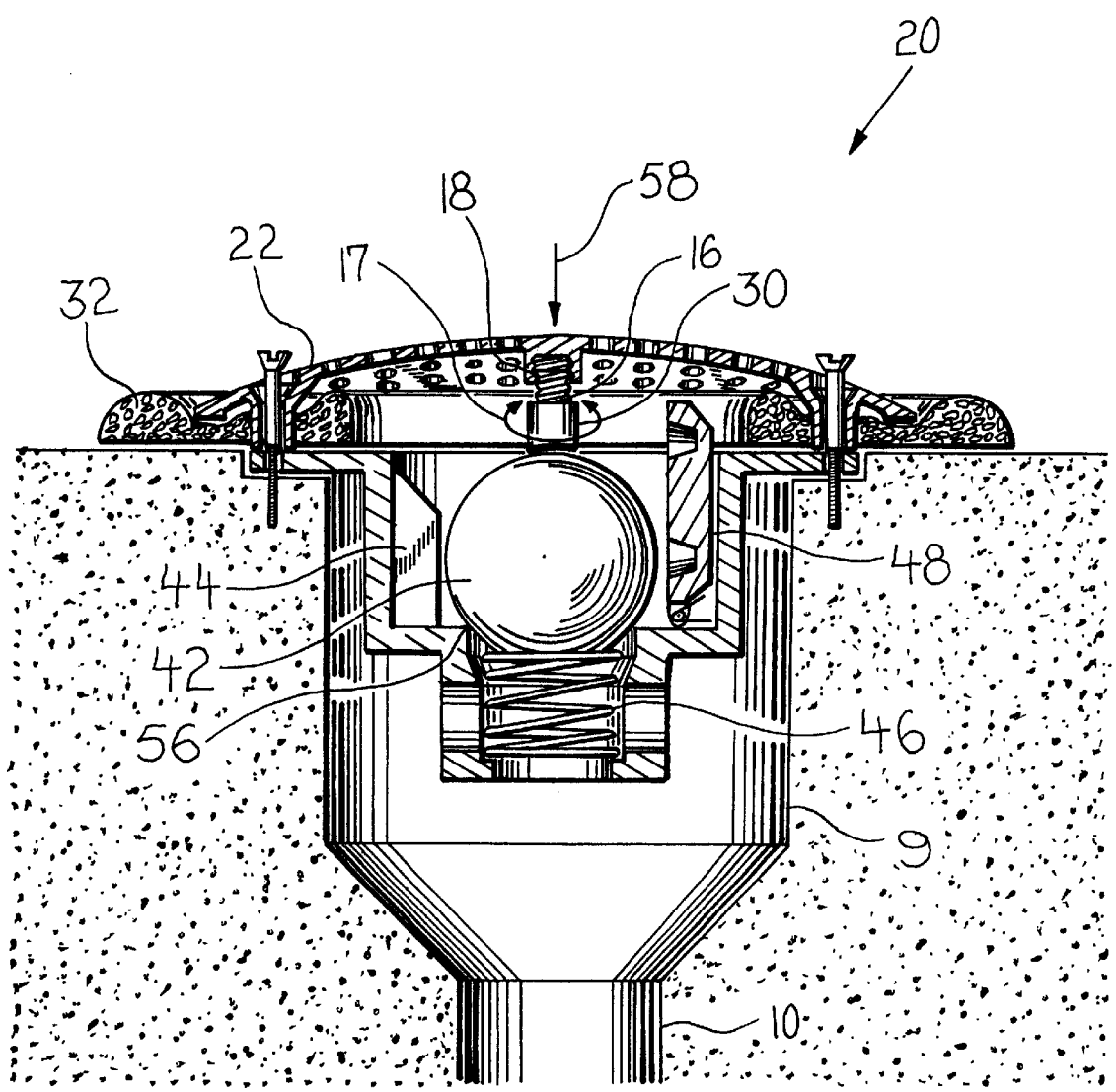
FIG. 3 is a side cross-sectional isometric view of an automatic shut-off valve in the closed position.
Figure 4:
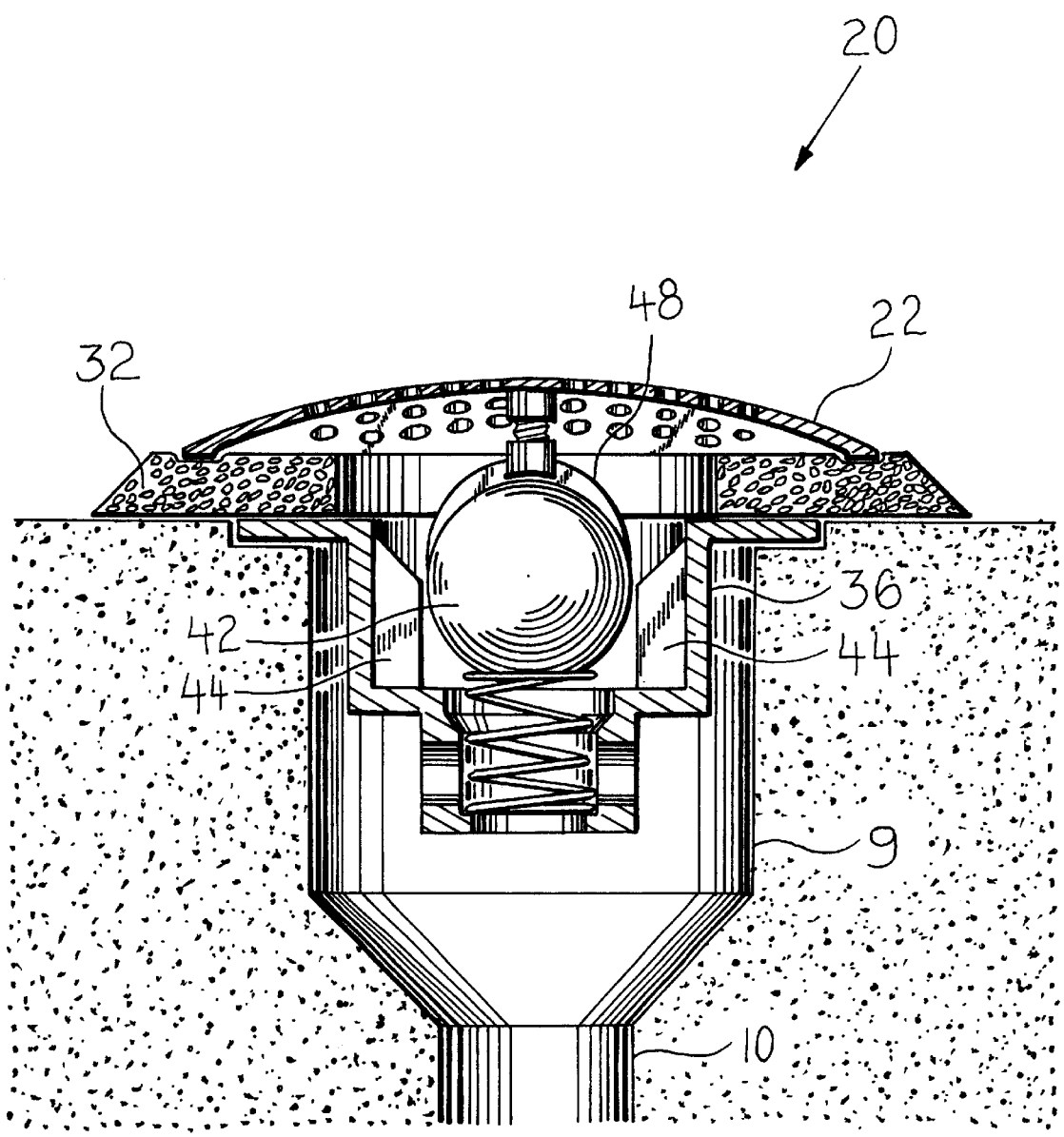
FIG. 4 is a front cross-sectional isometric view of an automatic shut-off valve in the open position.

Referring now to FIGS. 2 and 3, we observe a side cross-sectional isometric view of automatic shut-off valve 20 in the open and closed positions, respectively. FIG. 4 is a front cross-sectional isometric view of automatic shut-off valve 20 in the open position. Automatic shut-off valve 20 comprises soft gasket 32 and ball 42 sandwiched between grate 22 and housing 36. Ball 42 is fabricated of material with positive buoyancy, or air-filled, so as to float if it escapes from the instant automatic shut-off valve 20. Thus, the buoyancy of ball 42 provides an important warning function: if ball 42 floats to the surface of a pool or spa into which automatic shut-off valve 20 has been installed, observers and swimmers will thereby receive notice that automatic shut-off valve 20 is in need of repair or maintenance.

Screws 28 fasten housing 36 to an existing sump lip 11. The instant automatic shut-off valve 20 may be retrofitted to existing sumps 9 using existing threaded bores in sump lip 11. Soft gasket 32 comprises soft gasket bore 34 and soft gasket ramp 35. Soft gasket ramp 35 permits automatic pool cleaning apparatus to crawl over the instant automatic shut-off valve 20 without getting stuck.

Figure 8:
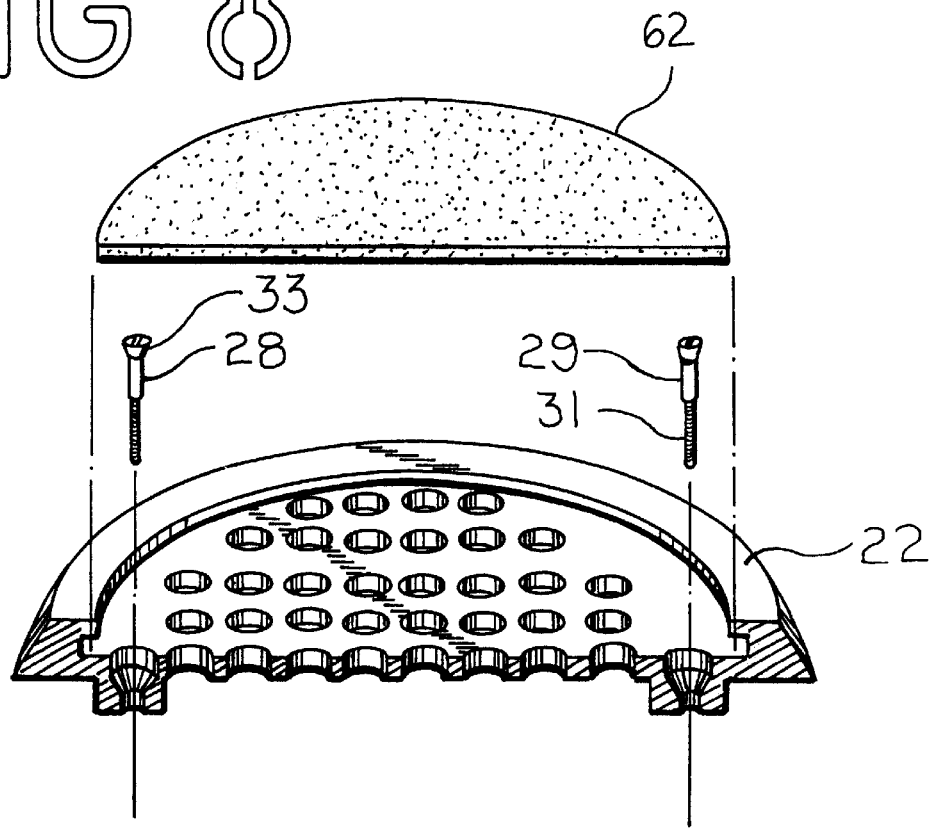
FIG. 8 is an exploded side cross-sectional isometric view of a hair barrier, grate and screws ready to be installed in a main drain.

As may be observed also in FIG. 8, screws 28 are stepped screws comprising a screw upper portion 29, and a screw lower portion 31. The diameter of screw upper portion 29 is greater than the diameter of screw lower portion 31. Housing 36 comprises a plurality of housing screw bores 54 sized to slidably admit screw lower portion 31, but not screw upper portion 29. Screws 28 fasten housing 36 securely in place, sandwiched between screw upper portion 29 and sump lip 11.

Grate 22 comprises a grate screw bore 26 corresponding to each housing screw bore 54. Each grate screw bore 26 is sized to slidably admit a screw upper portion 29, but not screw head 33. Thus, grate 22 may slide up and down along screw upper portion 29; its end-of-travel upper stop is provided by screw head 33, and its end-of-travel lower stop is provided by housing 36.

Grate 22 also comprises grate apertures 23 which allow water to flow through grate 22, and actuator finger 30. One extreme of actuator finger 30 is rigidly attached to grate 22; an opposite extreme of actuator finger 30 is disposed in close proximity to ball 42. As may be observed more clearly in FIG. 3, actuator finger 30 may be threadably attached to grate 22 by means of actuator finger male thread 16 threaded into mating grate threaded bore 18. By means of this threaded connection, the precise length of actuator finger 30 may be easily set by simply rotating actuator finger 30 as indicated by arrow 17.

Grate 22 further comprises grate foot 24 which rests on soft gasket 32. Grate foot 24 is disposed around the perimeter of grate 22. When automatic shut-off valve 20 is in the open position depicted in FIGS. 2 and 4, grate 22 slightly compresses soft gasket 32 in order to prevent any water flow between grate 22 and sump lip 11: in order for the instant automatic shut-off valve 20 to function properly, all water flow must be through grate apertures 23 and housing 36.

Soft gasket 32 is manufactured of resilient material which may be easily compressed. When a force holding soft gasket 32 compressed is removed, soft gasket 32 will tend to return to its original dimensions. Soft gasket 32 acts as a seal, to prevent water flow between grate 22 and sump lip 11, and also acts to some extent like a spring, urging grate 22 upwards until stopped by screw heads 33.

Housing 36 comprises housing ball chamber 38 communicating with housing spring chamber 40 through valve seat 56. Housing spring chamber 40 communicates with sump 9 through at least one housing spring chamber aperture 41. Housing spring chamber 40 contains ball spring 46. When extended, ball spring 46 holds ball 42 out of valve seat 56, permitting water to flow between ball 42 and valve seat 56, and thence through housing spring chamber 40 and housing spring chamber apertures 41 into sump 9 and outflow pipe 10.

Housing ball chamber 38 comprises vanes 44 which in concert with cap 48 act as guides to constrain the motion of ball 42 to reciprocation substantially along a line from actuator finger 30 through the center of ball spring 46. Thus when automatic shut-off valve 20 is in the open position depicted in FIGS. 2 and 4, ball 42 is held out contact with valve seat 56 by ball spring 46, constrained from floating upwards by actuator finger 30, and held in place horizontally by vanes 44 and cap 48. Conversely, when automatic shut-off valve 20 is in the closed position depicted in FIG. 3, ball 42 is held in intimate contact with valve seat 56 by the differential water pressure above and below ball 42 against the force of ball spring 46, and held in place horizontally by valve seat 56.

In the open position of automatic shut-off valve 20 depicted in FIG. 2, water being recirculated flows through grate apertures 23, soft gasket bore 34, housing ball chamber 38, valve seat 56, housing spring chamber 40 and housing spring chamber aperture(s) 41 into sump 9 and outflow pipe 10, as indicated by arrows 51.

Operation of Automatic Shut-off Valve 2

If grate 22 becomes partially or completely blocked (by a swimmer, for example), the water pressure differential between water above and below grate 22 pushes grate 22 downward as indicated by arrow 58 in FIG. 3. In turn, actuator finger 30 rigidly attached to grate 22 pushes ball 42 downwards towards valve seat 56, against the spring force of ball spring 46 and the resiliency of soft gasket 32.

When ball 42 is sufficiently close to valve seat 56, either actuator finger 30 or the water pressure differential between water above and below ball 42 (or both) pushes ball 42 into intimate contact with valve seat 56, thereby stopping flow of water through automatic shut-off valve 20. The water pressure differential between water above and below ball 42 then holds ball 42 securely in valve seat 56 until the recirculation pump is turned off. Thus in operation, ball 42 acts as a surrogate swimmer: ball 42 is entrapped by main drain vacuum instead of the swimmer!

It is important to note that the closing action of automatic shut-off valve 20 occurs directly at main drain 6, within microseconds of any grate 22 blockage sufficiently great to create a risk of bodily injury. The virtually instantaneous action of the instant automatic shut-off valve 20 represents a significant injury protection advance over existing in-line vacuum sensing valves, which may not close until injury has already occurred.

Once the recirculation pump is turned off, and the partial vacuum within sump 9 is relieved, the spring force of ball spring 46, the resiliency of soft gasket 32, and the buoyancy of ball 42 push grate 22 back into the open position depicted in FIG. 2.

Figure 5:
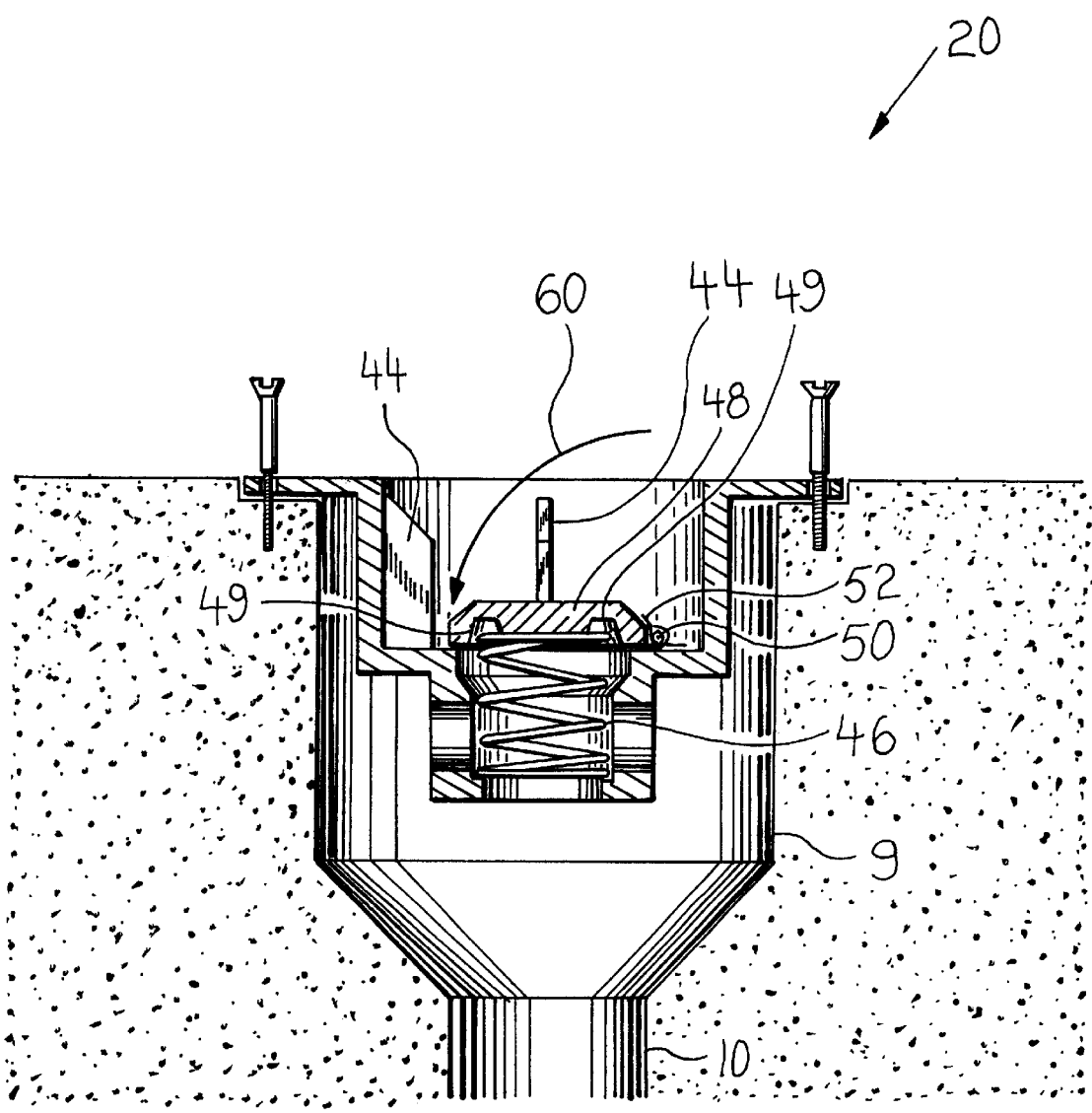
FIG. 5 is a side cross-sectional isometric view of an automatic shut-off valve missing its grate and soft gasket, whose cap has therefore closed automatically as a backup flow shut-off device.

Referring now to FIG. 5, an important back-up main drain shut-off function is provided by cap 48. Cap 48 is sized to cover valve seat 56. Cap 48 also comprises cap groove 49, which is sized to admit the upper portion of ball spring 46, so as to avoid interference between ball spring 46 and cap 48 when the latter is in the closed position.

Cap 48 is hingedly attached to housing ball chamber 38 by means of cap hinge 50, and spring loaded into the closed position depicted in FIG. 5 by means of cap spring 52. Thus, if grate 22 and ball 42 were to become dislodged, cap 42 would automatically close as urged by cap spring 52 and as indicated by arrow 60, thereby covering valve seat 56. When closed, cap 48 helps avoid the possibility that an individual could become trapped against main drain 6, or that an individual's hair could become entangled, because water flow has been blocked by cap 48.

Figure 9:
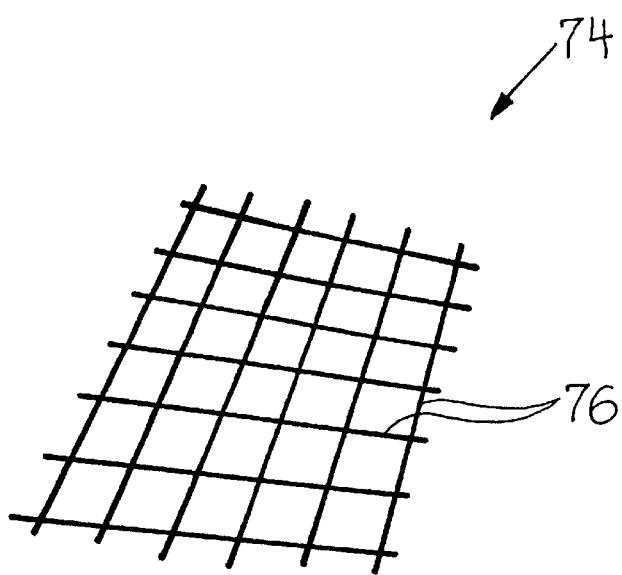
FIG. 9 is a top isometric view of a section of mesh grate.

In FIGS. 2–4 and 6–8 grate 22 is depicted comprising round grate apertures 23. It is important to note, however, that the shape of grate apertures 23 may be any shape conducive to minimizing the restriction of water flow through grate apertures 23, including square or rectangular grate apertures 23 commonly present in mesh type grates. A section of one such mesh grate 74 is depicted in FIG. 9. Mesh grate 74 comprises criss-crossing strands 76 which define grate apertures 23, which in this case are square. The small width of strands 76 contributes towards reducing resistance to water flow through mesh grate 74. Strands 76 may be made of wire, plastic, nylon, other synthetic, or other appropriate material.

FIG. 5 is a side cross-sectional isometric view of automatic shut-off valve 20 missing its grate 22, ball 42 and soft gasket 32. As soon as ball 42 is no longer present to hold cap 48 open against the force of cap spring 52, cap spring 52 urges cap 48 closed over valve seat 56 as indicated by arrow 60. This closing of cap 48 interrupts any flow of water through automatic shut-off valve 20, and the water pressure differential between water above and below cap 48, and cap spring 52, then hold cap 48 securely closed until the recirculation pump is turned off. In addition, as previously described, ball 42 is designed to float, so if it became dislodged, ball 42 would float to the surface of a pool or spa into which automatic shut-off valve 20 had been installed, thereby providing observers and swimmers notice that automatic shut-off valve 20 is in need of repair or maintenance.

Figure 6:
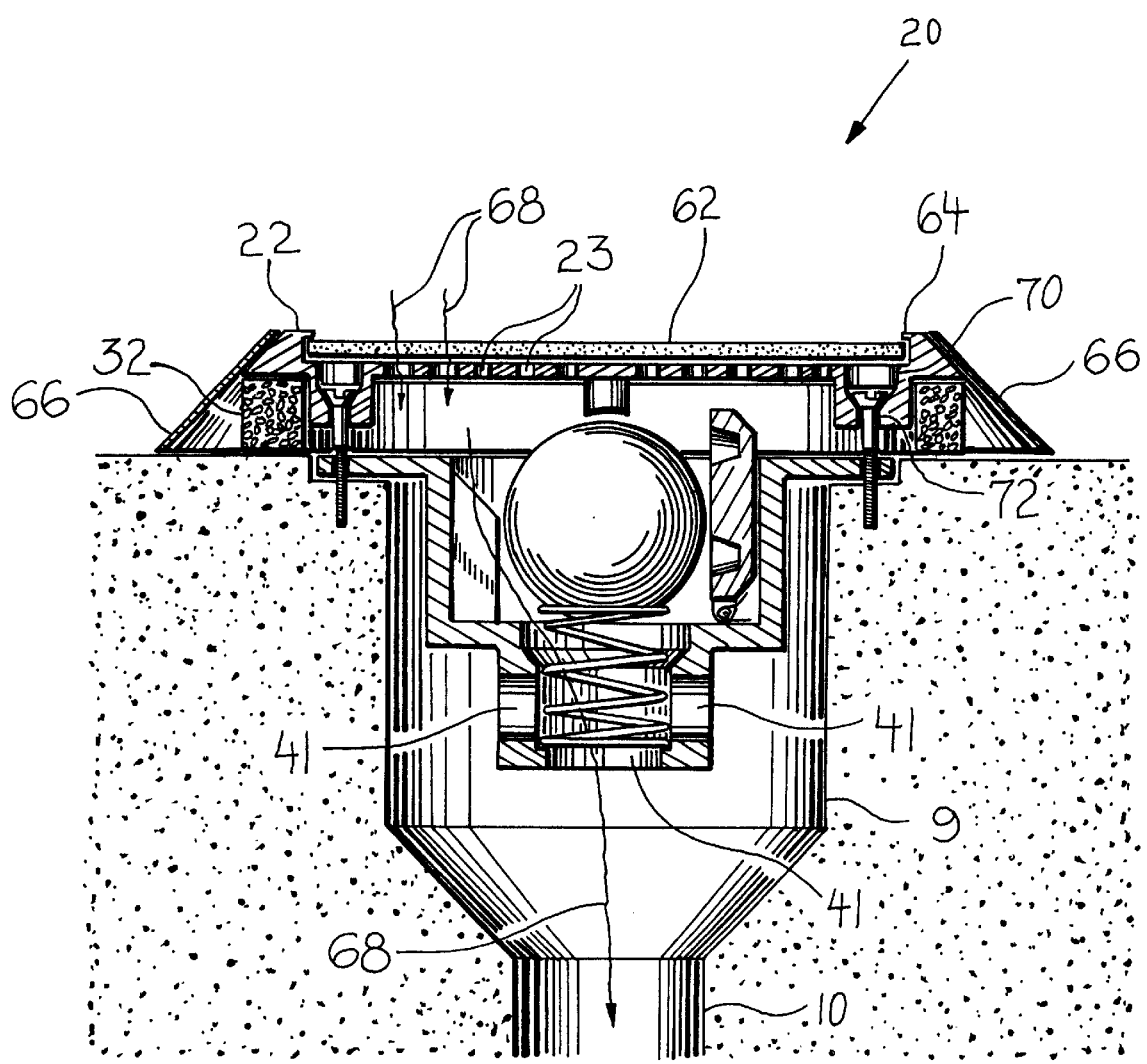
FIG. 6 is a side cross-sectional isometric view of an automatic shutoff valve incorporating a hair barrier.

FIG. 6 is a side cross-sectional isometric view of an alternate embodiment automatic shutoff valve 20 incorporating hair barrier 62. Hair barrier 62 is a porous disc which permits water to pass, but which prevents hair from passing through. In fact, the passages through hair barrier 62 are so serpentine that a hair cannot penetrate sufficiently to even get stuck. Hair barrier 62 is installed on top of grate 22, and snapped in place behind grate lip 64. Grate screw bore 26 comprises lower grate screw bore 72 communicating with upper grate screw bore 70. Lower grate screw bore 72 is sized to slidably admit screw upper portion 29, but not screw head 33; upper grate screw bore 70 is sized to slidably admit screw head 33. When the automatic shut-off valve 20 depicted in FIG. 6 is closing, grate 22 is free to move towards valve seat 56 without hair barrier 62 butting against screw heads 33, by virtue of upper grate screw bores 70. Grate 22 supports and provides strength and rigidity to hair barrier 62.

When open, the automatic shut-off valve 20 depicted in FIG. 6 permits water to pass through hair barrier 62, grate apertures 23, soft gasket bore 34, housing ball chamber 38, valve seat 56, housing spring chamber 40 and housing spring chamber aperture(s) 41 into sump 9 and outflow pipe 10, as indicated by arrows 68. The automatic shut-off valve 20 depicted in FIG. 6 closes automatically in the presence of blockage in the same manner as described previously.

Hair barrier 62 serves the dual functions of preventing hair entrapment, and acting as a filter to keep debris out of housing 36 which might interfere with the automatic closing function of automatic shut-off valve 20.

FIG. 6 depicts an alternate embodiment of soft gasket ramp 35 embodiment: flexible skirt 66. Flexible skirt 66 is shaped like a Belleville washer, and is attached at its inside diameter to soft gasket 32. Flexible skirt 66 permits automatic pool cleaning apparatus to crawl over the instant automatic shut-off valve 20 without getting stuck.

Figure 7:
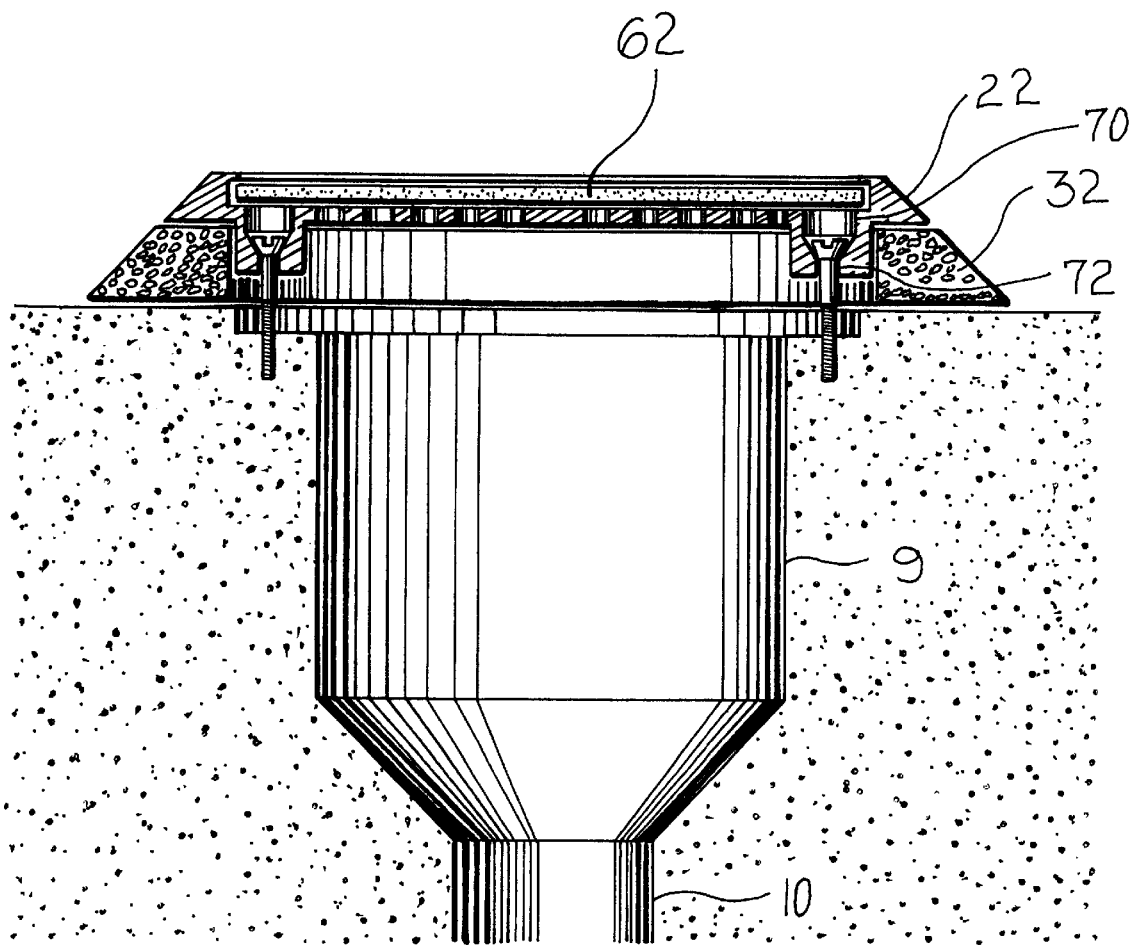
FIG. 7 is a side cross-sectional isometric view of a hair barrier installed in a main drain.

FIG. 7 is a side cross-sectional isometric view of a hair barrier 62 installed in a main drain, without a housing 36 or ball 42 being installed. This figure is intended to illustrate an embodiment of the instant invention where a hair barrier 62 is installed without housing 36 or ball 42. FIG. 8 is an exploded side cross-sectional isometric view of a hair barrier 62, grate 22 and screws 28 ready to be installed in a main drain.

In the preferred embodiment, grate 22, housing 36, actuator finger 30, cap 48 and screws 28 were manufactured of nylon, plastic, synthetic, metal, or other appropriate material. Soft gasket 32 was made of foam rubber, synthetic, or other appropriate material. Hair barrier 62 was made of porous plastic or other appropriate material. One such porous plastic material comprises interconnected pores ranging in size from 0.0008–0.01 inch, although larger pore sizes could also be used. The pores are interconnected along tortuous paths, thus preventing hair from penetrating hair barrier 62 sufficiently to become entwined. In addition, hair barrier 62 could be manufactured with an uneven top surface which would, by virtue of its unevenness, prevent total blockage by swimmers and thus avoid entrapment and/or disembowelment where the embodiment of the instant invention depicted in FIGS. 7 and 8 is used. Ball spring 46 and cap spring was manufactured of metal, synthetic, or other appropriate material.

While a preferred embodiment of the invention has been illustrated herein, it is to be understood that changes and variations may be made by those skilled in the art without departing from the spirit of the appending claims.

DRAWING ITEM INDEX 2 pool
4 water
6 main drain
8 grate
9 sump
10 outflow pipe
11 sump lip
12 pump
14 inflow pipe
16 actuator finger male thread
17 arrow
18 grate threaded bore
20 automatic shut-off valve
22 grate
23 grate apertures
24 grate foot
26 grate screw bore
28 screw
29 screw upper portion
30 actuator finger
31 screw lower portion
32 soft gasket
33 screw head
34 soft gasket bore
35 soft gasket ramp
36 housing
38 housing ball chamber
40 housing spring chamber
41 housing spring chamber aperture
42 ball
44 vane
46 ball spring
48 cap
49 cap groove
50 cap hinge
51 arrow
52 cap spring
54 housing screw bore
56 valve seat
58 arrow
60 arrow
62 hair barrier
64 grate lip
66 flexible skirt
68 arrow
70 upper grate screw bore
72 lower grate screw bore
74 mesh grate
76 strand

I claim:

1. An automatic shut-off valve comprising a soft gasket, a ball, and a ball spring disposed between a grate and a housing, said grate comprising a plurality of grate apertures, said soft gasket comprising a soft gasket bore, said housing comprising a housing ball chamber communicating with a housing spring chamber through a valve seat, said ball being sized to sealably seat in said valve seat when said automatic shut-off valve is in a closed position, said ball being disposed substantially within said ball chamber, said ball spring being disposed substantially within said spring chamber, said ball spring urging said ball out of contact with said valve seat, said housing further comprising at least one housing spring chamber aperture through which said spring chamber communicates with an exterior of said housing spring chamber.

2. The automatic shut-off valve of claim 1 wherein said ball is made of material with positive buoyancy.

3. The automatic shut-off valve of claim 2 wherein said grate further comprises an actuator finger, one extreme of said actuator finger being rigidly attached to said grate, the positive buoyancy of said ball urging said ball against an extreme of said actuator finger opposite said grate.

4. The automatic shut-off valve of claim 3 further comprising a means of adjusting a length of said actuator finger.

5. The automatic shut-off valve of claim 4 wherein said means of adjusting a length of said actuator finger comprises an actuator finger male thread sized to mate with a grate threaded bore.

6. The automatic shut-off valve of claim 1 wherein said grate is slidably attached to said housing by means of screws, each said screw extending through a grate screw bore and a corresponding housing screw bore, each said screw comprising a screw upper portion between a screw lower portion and a screw head, each said grate screw bore being sized to slidably admit said screw upper portion but not said screw head, each said housing screw bore being sized to admit said screw lower portion but not said screw upper portion.

7. The automatic shut-off valve of claim 1 wherein said soft gasket further comprises a ramp disposed around its perimeter, whereby automatic pool cleaning apparatus may crawl over said automatic shut-off valve without getting stuck.

8. The automatic shut-off valve of claim 1 wherein said housing ball chamber further comprises a plurality of vanes rigidly attached to its wall and extending substantially perpendicular to its wall, whereby a horizontal position of said ball may be limited to a position substantially over said valve seat, said ball remaining free to reciprocate vertically.

9. The automatic shut-off valve of claim 1 wherein said automatic shut-off valve further comprises a cap hingedly attached to said housing ball chamber by means of a cap hinge, said cap when closed blocking said valve seat, said cap when open resting against an inside wall of said housing ball chamber, said cap being spring-loaded by means of a cap spring into a closed position covering said valve seat.

10. The automatic shut-off valve of claim 9 wherein said cap further comprises a cap groove sized to admit an upper portion of said ball spring when said cap is in a closed position covering said valve seat, whereby said cap may close completely over said valve seat without interference from said ball spring.

11. The automatic shut-off valve of claim 1 further comprising a hair barrier disposed over said grate, said hair barrier covering all said grate apertures, and a means of retaining said hair barrier in position over said grate, said hair barrier being made of porous material pervious to water but not to hair.

12. The automatic shut-off valve of claim 11 wherein said means of retaining said hair barrier in position over said grate comprises a grate lip sized to overlap a perimeter of said hair barrier.

13. The automatic shut-off valve of claim 11 wherein said hair barrier comprises serpentine passages whose minimum width is 0.0008 inches to 0.010 inches.

14. The automatic shut-off valve of claim 1 wherein said grate is slidably attached to said housing by means of screws, each said screw extending through an upper grate screw bore, a lower grate screw bore, and a corresponding housing screw bore, each said screw comprising a screw upper portion between a screw lower portion and a screw head, each said upper grate screw bore being sized to slidably admit said screw head, each said lower grate screw bore being sized to slidably admit said screw upper portion but not said screw head, and each said housing screw bore being sized to admit said screw lower portion but not said screw upper portion.

15. The automatic shut-off valve of claim 1 further comprising a flexible skirt attached to a perimeter of said grate, said flexible skirt being shaped like a Belleville washer whose inside diameter is attached to on upper outside edge of said grate, said flexible skirt extending down and away from said upper outside edge of said grate, whereby automatic pool cleaning apparatus may crawl over said automatic shut-off valve without getting stuck.

16. A method of preventing entrapment and/or disembowelment by pool or spa main drain suction by means of an automatic shut-off valve installed over a main drain, said automatic shut-off valve comprising a ball constrained within a housing and a grate covering said housing, said housing comprising a valve seat sized to sealably seat said ball, said grate comprising grate apertures, said method comprising the steps of:

A. A swimmer in danger of imminent entrapment or disembowelment pressing down on said grate toward said main drain and/or said swimmer covering a sufficient number of said grate apertures for a main drain vacuum to pull said grate downwards toward said main drain;

B. A downward motion of said grate moving said ball into close proximity to said valve seat; and C. Said main drain vacuum entrapping and holding said ball instead of said endangered swimmer, thus avoiding entrapment and/or disembowelment of said swimmer.

17. The method of claim 16 wherein said automatic shut-off valve further comprises a hair barrier installed over said grate, said hair barrier covering all said grate apertures, and a means of retaining said hair barrier in position over said grate, said hair barrier being a disc of porous material pervious to water but not to hair, and wherein said method comprises the additional step of avoiding hair entanglement in said main drain or said automatic shut-off valve by virtue of said hair barriers.

* * * * *

UNITED STATES PATENT AND TRADEMARK OFFICE
CERTIFICATE OF CORRECTION

PATENT NO. : 6,295,661 B1  
DATED : October 2, 2001  
INVENTOR(S) : Arthur J. Bromley Page 1 of 1

It is certified that error appears in the above-identified patent and that said Letters Patent is hereby corrected as shown below:

<u>Title page,</u>  
ABSTRACT,  
Line 1, is "...sing pool..." change to -- ...swimming pool... --

<u>Column 5,</u>  
Line 52, is "...Valve 2..." change to -- ...Valve 20... --

<u>Column 6,</u>  
Line 66, is "One paragraph" change to -- Two paragraphs --

Signed and Sealed this

Twenty-sixth Day of March, 2002

*Attest:*

*Attesting Officer*

JAMES E. ROGAN  
*Director of the United States Patent and Trademark Office*